June 3, 1958   F. W. COOK   2,836,977
CUMULATIVE GAUGE
Filed Sept. 27, 1954
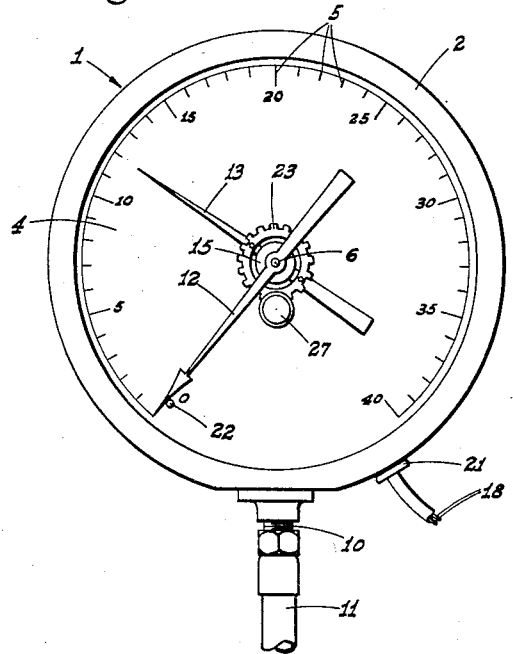
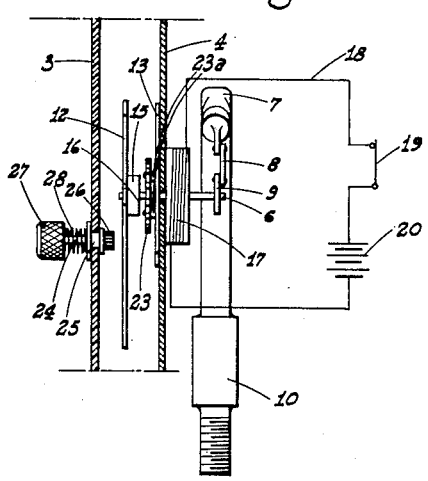
INVENTOR
Franklin W. Cook
BY
Webster & Webster
ATTYS.

United States Patent Office 2,836,977
Patented June 3, 1958

2,836,977
CUMULATIVE GAUGE

Franklin W. Cook, Sacramento, Calif., assignor, by mesne assignments, to Wafast Indicator Co., Omo Ranch, Eldorado County, Calif., a partnership Application September 27, 1954, Serial No. 458,439

8 Claims. (Cl. 73—417)

This invention relates on general to an improvement in fluid pressure actuated gauges calibrated in terms of weight; the gauge being especially adapted—but not limited—for use in connection with the hydraulic system of the load lifting power cylinder of a fork-lift truck or the like, whereby the pressure in said cylinder which is required to raise each load is translated into a reading on the gauge which indicates to the operator of the truck the weight of each load.

The principal object of the present invention is to provide a gauge—of the type described—which includes a novel, cumulative weight indicating device or mechanism; i. e., a mechanism by means of which the load weights indicated by a primary hand upon successive operations of the gauge are cumulated in a total reading reflected by a secondary hand of said gauge.

Another important object of the invention is to provide a gauge, as above, wherein such cumulative weight indicating mechanism includes, with said hands, a novel assembly of magnets; there being one magnet operative to releasably secure the secondary hand to the primary hand for travel with the same upon each advance thereof, and another magnet operative to hold the secondary hand released from said one magnet and in a maximum position of advance during each return of the primary hand to its starting or zero position.

An additional object of this invention is to provide a gauge, as in the preceding paragraph, wherein said one magnet is of permanent type and the other magnet is of electric type; there being a control circuit for such latter magnet, and which circuit controls operation of the assembly of magnets and the cumulative weight indicating action of the gauge.

It is also an object of the invention to provide a cumulative gauge which is designed for ease and economy of manufacture, either as an initial component of the gauge, or for subsequent conversion of existing gauges; the gauge being smooth, positive, and accurate in its operation.

Still another object is to provide a practical and reliable cumulative gauge, and one which will be exceedingly effective for the purpose for which it is designed.

These objects are accomplished by means of such structure and relative arrangement of parts as will fully appear by a perusal of the following specification and claims.

In the drawings:

Fig. 1 is a front elevation of a fluid pressure actuated gauge embodying the present invention; the primary hand being shown in its starting or zero position, and the secondary hand being shown in a cumulative position.

Fig. 2 is a fragmentary front to rear elevation of the gauge showing the magnet assembly with the parts in the positions occupied thereby when the secondary hand is magnetically released from the primary hand for return of the latter to said starting or zero position; the face and dial being in section, and the view including—diagrammatically—the control circuit.

Fig. 3 is a view similar to Fig. 1, but shows the cumulative progression of the secondary hand upon advance of the primary hand from said starting or zero position.

Fig. 4 is a view similar to Fig. 2, but shows the magnet assembly with the parts in the positions occupied thereby when the secondary hand is magnetically secured in connection with the primary hand for travel therewith; i. e., for progressive cumulative motion.

Fig. 5 is an enlarged fragmentary sectional elevation showing particularly the magnet assembly; the parts of the latter being in the same positions as in Fig. 2.

Referring now more particularly to the drawings, and to the characters of reference marked thereon, the present invention is embodied in a fluid pressure actuated gauge, indicated generally at 1, which is of the type having a circular case or housing 2 which carries a transparent face 3 overlying—in spaced relation—a dial 4. In the present instance the dial 4 is of a non-metallic substance.

The dial 4 is marked on the front and about the periphery with a scale 5 calibrated in terms of weight. A spindle 6, suitably journaled and held against axial movement, extends axially through the dial 4, and projects a distance both forwardly and rearwardly thereof.

A conventional Bourdon tube 7 is mounted, by means not here shown, in the case 2 rearwardly of the dial 4; the free or working end of said Bourdon tube being connected by an actuated linkage 8 to a radial lever 9 fixed on the adjacent end portion of the spindle 6.

At its opposite end the Bourdon tube 7 is connected to a fitting 10 which is attached rigidly to, and leads out of, the case 2 for connection with a conduit 11 which leads to connection with the hydraulic system of the load lifting power cylinder of a fork-lift truck or the like on which the gauge is mounted within the view of the truck operator.

Spaced ahead of the dial 4 the spindle 6 carries, in fixed relation, a primary hand 12 adapted to read on the peripheral scale 5.

A secondary hand 13 is disposed between the dial 4 and primary hand 12; said secondary hand 13 including a hub 14 which is initially turnably and axially slidably supported on the spindle 6. The secondary hand 13 is likewise adapted to read on the peripheral scale 5.

A circular, permanent magnet 15 is fixed on and surrounds the spindle 6 immediately inwardly of the primary hand 12; such permanent magnet 15 being of a diameter approaching that of the hub 14 of the secondary hand 13.

The adjacent circular faces of the permanent magnet 15 and the hub 14 of the secondary hand 13, which faces engage in the manner hereinafter described, are provided with a frictional surfacing, such as flocking, indicated at 16.

A circular or ring-like electro-magnet 17 is secured to the back side of the dial 4 in concentric surrounding but clearance relation to the spindle 6; said electro-magnet being interposed in a control circuit 18 having a switch 19 and a battery 20 interposed therein in series. The switch 19 is mounted on the truck in a position readily manually accessible to the operator, as is the control valve for the hydraulic system of the load lifting hydraulic power cylinder.

The circuit 18 enters the case 2 through a suitable grommet 21.

In operation of the above described cumulative gauge both the primary hand 12 and the secondary hand 13 are initially at a starting or zero position resting against a stop 22; said secondary hand 13 normally being releasably secured to the primary hand 12 by reason of magnetic engagement of the hub 14 with the permanent magnet 15. See Fig. 4.

The frictional surfacing 16 on said hub and magnet assures against accidental relative rotation between the hands 12 and 13 when they are so magnetically engaged with each other.

Upon the occurrence of an initial operation of the gauge, the secondary hand 13 thus travels with the primary hand 12 to the point of maximum advance, and at which time the primary hand 12 reads on the dial scale 5 in terms of load weight. Thereafter, and before the pressure on the gauge is relieved to permit the primary hand 12 to return to its starting or zero position preparatory to lifting of the next load, the circuit 18 is closed by the switch 19. This energizes the electro-magnet 17, which magnet as so energized exerts greater magnetic attraction on the secondary hand 13, including its hub 14, than the permanent magnet 15.

The result is that the secondary hand 13 shifts axially rearwardly on the spindle 6 into face to face engagement with the dial 4, which then maintains said hand 13 in a fixed position. While the electro-magnet 17 is disposed rearwardly of the dial 4 the latter is of non-metallic material so that the magnetic attraction of such electro-magnet 17 is effective—through said dial—to shift hand 13 as above.

The switch 19 remains closed until the primary hand 12 has returned to its starting or zero position, and said switch is then opened. Upon opening of the switch 19 the secondary hand 13, including the hub 14, is released from the effect of the electro-magnet 17 and is pulled forward on the spindle 6 by the action of permanent magnet 15.

At such time the secondary hand 13 is reading on the scale 5 ahead of the primary hand 12 at a point which reflects the weight of the initial load.

The foregoing operation of the gauge, including the magnet assembly, is repeated with each successive gauge operation; i. e. with each advance and return of the primary hand 12. This results in a cumulative reading by the secondary hand 13 on the scale 5, reflecting the total of the weights indicated by the successive operations of the primary hand 12 of the gauge.

Thus, the gauge is not only effective to indicate the weight of each load handled by the truck, but also cumulates such weights in a manner so that the cumulative total can be readily visually ascertained.

It is necessary that means be provided to return the secondary hand manually to the starting or zero position against the stop 22 when desired; such means comprising the following:

A ring-like gear 23 is disposed slightly ahead of the hub 14 but rearwardly of the primary hand 12; such gear being secured to the hub 14 by stand-off pins 23a. The gear 23 surrounds the spindle 6 in concentric relation, and has an internal diameter of sufficient size that when the secondary hand 13 slides forwardly for engagement with the permanent magnet 15, the gear surrounds the latter in clearance relation.

A short shaft 24 extends through a bushing 25 on the face 3 in offset relation to the spindle 6, and such shaft is fitted, at its inner end, with a small pinion 26 adapted to mesh with the gear 23. At its outer end the shaft 24 is fitted with a reset knob 27, and a compression spring 28 surrounds the shaft 24 between the face 3 and knob 27, whereby to maintain the pinion 26 normally spaced forwardly from the gear 23. However, upon pushing inwardly on the knob 27 the pinion 26 meshes with the gear 23, whereby the latter can then be rotated by the knob 27 in order to turn the secondary hand 13 back to the starting or zero position against the stop 22.

From the foregoing description it will be readily seen that there has been produced such a device as will substantially fulfill the objects of the invention, as set forth herein.

While this specification sets forth in detail the present and preferred construction of the device, still in practice such deviations therefrom may be resorted to as do not form a departure from the spirit of the invention, as defined by the appended claims.

Having thus described the invention, the following is claimed as new and useful, and upon which Letters Patent are desired:

1. In a gauge which includes a dial having a scale thereon, a spindle extending axially of the dial, a primary hand fixed on the spindle to read on the dial scale, and pressure actuated means operative to rotate said spindle; a secondary hand on the spindle to likewise read on the dial scale, said secondary hand being relatively turnable on the spindle, a permanent magnet arranged to normally couple the secondary hand to the primary hand for travel therewith, a normally deenergized electro-magnet arranged to act when energized to overcome the effect of said permanent magnet and to uncouple the secondary hand from said primary hand, the electro-magnet then holding the secondary hand against rotation about the spindle, and a control circuit for the electro-magnet.

2. A gauge, as in claim 1, in which the permanent magnet is secured in connection with the spindle forwardly of the secondary hand, the latter being slidable on the spindle into engagement with said permanent magnet, and the electro-magnet being fixed in connection with the dial rearwardly of said secondary hand.

3. A gauge, as in claim 2, in which the electro-magnet is disposed rearwardly of the dial; the latter being of non-metallic material.

4. In a gauge which includes a dial having a scale thereon, a spindle extending axially of the dial, a primary hand fixed on the spindle to read on the dial scale, and pressure actuated means operative to rotate said spindle; a secondary hand on the spindle to likewise read on the dial scale, the primary hand being spaced from the dial and the secondary hand being disposed between the same for relative rotation and axial sliding on the spindle, a permanent magnet fixed on the spindle adjacent the primary hand operative to normally releasably secure the secondary hand in a forward position on the spindle for rotation with said primary hand, a normally deenergized electro-magnet mounted in connection with the dial normally spaced rearwardly of the secondary hand, said electro-magnet when energized being effective to release and cause rearward axial sliding of the secondary hand from the permanent magnet, the secondary hand then being held by said electro-magnet against rotation with the spindle, and a normally open, switch closed energizing circuit for the electro-magnet.

5. A gauge, as in claim 4, in which the permanent magnet surrounds the spindle rearwardly of the primary hand, and there being reset means for the secondary hand including a ring gear secured to but spaced in front of the secondary hand concentrically of the spindle; said gear having a central opening of sufficient size to permit the gear to surround the permanent magnet in clearance relation when the secondary hand is in said forward position.

6. A gauge, as in claim 4, in which the permanent magnet surrounds the spindle rearwardly of the primary hand, and the secondary hand includes a hub; the permanent magnet and said hub having normally engaged adjacent faces.

7. A gauge, as in claim 6, in which said faces of the permanent magnet and hub have friction material thereon.

8. In a gauge which includes a dial having a scale thereon, a spindle extending axially of the dial, a primary hand fixed on the spindle to read on the dial scale, and pressure actuated means operative to rotate said spindle; a secondary hand on the spindle to likewise read on the dial scale, the primary hand being spaced from the dial and the secondary hand being disposed between the same for relative rotation and axial sliding on the spindle, a permanent magnet fixed in connection with the spindle rearwardly of the primary hand operative to normally releasably secure the secondary hand in a forward position on the spindle for rotation with said primary hand, the secondary hand having a hub normally engaging the permanent magnet in substantially matching face to face engagement, a normally deenergized electromagnet mounted on the dial at the back thereof and in surrounding relation to the spindle, the dial being of nonmetallic material, said electro-magnet when energized being effective to release and cause rearward axial sliding of the secondary hand from the permanent magnet into face to face holding engagement with the front of the dial, the spindle and the primary hand then being rotatable independently of said secondary hand, and a normally open, switch closed energizing circuit for the electro-magnet.

References Cited in the file of this patent

UNITED STATES PATENTS

| | | |
|---|---|---|
| 1,623,820 | West | Apr. 5, 1927 |
| 2,080,165 | Cox | May 11, 1937 |
| 2,505,237 | Dwyer | Apr. 25, 1950 |
| 2,638,866 | Sage | May 19, 1953 |

FOREIGN PATENTS

| | | |
|---|---|---|
| 187,996 | Great Britain | Oct. 30, 1922 |